United States Patent
Jo et al.

(10) Patent No.: US 12,365,781 B2
(45) Date of Patent: Jul. 22, 2025

(54) METHOD FOR REMOVING CHLORINE FROM PYROLYSIS PROCESS OF WASTE PLASTIC

(71) Applicants: SK Innovation Co., Ltd., Seoul (KR); SK Geo Centric Co., Ltd., Seoul (KR)

(72) Inventors: Sanghwan Jo, Daejeon (KR); Sookil Kang, Daejeon (KR); Sangick Lee, Daejeon (KR); Jaeheum Jung, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/795,382

(22) Filed: Aug. 6, 2024

(65) Prior Publication Data

US 2025/0034349 A1    Jan. 30, 2025

Related U.S. Application Data

(63) Continuation of application No. 18/044,086, filed as application No. PCT/KR2022/013845 on Sep. 16, 2022.

(51) Int. Cl.
*C08J 11/16*   (2006.01)
*C08J 11/12*   (2006.01)

(52) U.S. Cl.
CPC ............... *C08J 11/16* (2013.01); *C08J 11/12* (2013.01); *C08J 2300/102* (2013.01)

(58) Field of Classification Search
USPC ........................................................ 521/40
See application file for complete search history.

(56) References Cited

U.S. PATENT DOCUMENTS

2012/0251424 A1    10/2012    Havlik et al.
2019/0270939 A1    9/2019    Javeed et al.

FOREIGN PATENT DOCUMENTS

| CN | 101050372 A | 10/2007 | |
|---|---|---|---|
| CN | 102268275 A | 12/2011 | |
| CN | 104437342 A * | 3/2015 | ............ B01J 20/041 |
| CN | 108517223 A | 9/2018 | |
| EP | 2489720 A1 | 8/2012 | |
| JP | 08290147 A * | 11/1996 | ............... C10G 1/10 |
| JP | H8290147 A | 11/1996 | |
| JP | 3263811 B2 | 3/2002 | |
| JP | 200269459 A | 3/2002 | |
| JP | 200671995 A | 3/2006 | |
| JP | 2007246681 A | 9/2007 | |
| JP | 2019123771 A | 7/2019 | |
| JP | 2019155319 A | 9/2019 | |
| KR | 101916404 B1 | 11/2018 | |
| WO | 2020239729 A1 | 12/2020 | |

OTHER PUBLICATIONS

JP 08-290147 A Machine Translation (Year: 1996).*
CN 104437342A Machine Translation (Year: 2015).*

* cited by examiner

*Primary Examiner* — Terressa Boykin
(74) *Attorney, Agent, or Firm* — The Webb Law Firm

(57) ABSTRACT

Provided is a method for removing chlorine from a waste plastic. The method includes a) reacting a waste plastic with a neutralizing agent; and b) reacting the product of step a) with a copper compound. 95% by weight or more of chlorine is removed based on the total weight of the waste plastic.

15 Claims, 1 Drawing Sheet

METHOD FOR REMOVING CHLORINE FROM PYROLYSIS PROCESS OF WASTE PLASTIC

CROSS-REFERENCE TO RELATED APPLICATIONS

This application is a continuation application of U.S. patent application Ser. No. 18/044,086 filed Sep. 16, 2022, which is the United States national phase of International Patent Application No. PCT/KR2022/013845 filed Sep. 16, 2022, and claims priority to Korean Patent Application No. 10-2021-0133010 filed Oct. 7, 2021, the disclosures of which are hereby incorporated by reference in their entireties.

BACKGROUND

Technical Field

The present disclosure relates to a method for removing chlorine from a pyrolysis process of waste plastics.

Technical Considerations

Oil (waste oil) generated through cracking and pyrolysis reactions of waste materials such as waste plastic pyrolysis oil contains a large amount of impurities resulting from waste materials. Thus, when the oil (waste oil) is used as fuel, there is a concern that air pollutants such as SOx and NOx may be discharged, and in particular, a Cl component may be converted to HCl, which may cause corrosion of the device during high-temperature treatment and may be discharged.

In the past, Cl was converted to HCl and removed through a hydrotreating (HDT) process using refinery technology, but since waste oil such as waste plastic pyrolysis oil contains a high content of Cl, problems such as equipment corrosion, abnormal reaction, and deterioration of product properties have been reported due to the generation of excess HCl formed in the HDT process, and it is difficult to introduce unpretreated waste oil into the HDT process. In order to remove Cl oil by utilizing the existing refinery process, there is need for a Cl reduction treatment technology for waste oil that reduces the Cl content to a level that may be introduced into the refinery process.

Prior Patent Document 1 (JP 2019-123771 A) discloses a method of treating a chlorine-containing plastic by mixing a chlorine-containing plastic and a calcium compound in a pyrolysis process, Prior Patent Document 2 (KR 10-1916404 B1) discloses a device for recycling plastic mixture containing polyvinyl chloride, including: an auger reactor connected in series, a fluidized bed reactor, and a hot filter filled with calcium oxide, and Prior Patent Document 3 (JP 2006-071995) discloses a method for generating fuel gas from a product of room temperature dechlorination treatment of PVC, wherein PVC (polyvinyl chloride) is mixed with an oxide, pulverized (mechanochemical treatment) at room temperature to dechlorinate PVC, and then the resulting product is heated to a temperature of 250° C. or less.

The chlorine-containing plastic treatment method described in the Prior Patent Documents 1 to 3 is advantageous in removing a large amount of chlorine resulting from PVC among waste plastics by using general additive/neutralizing agent such as an inexpensive calcium oxide adsorbent, but it is difficult to reduce the chlorine content to a level that may be introduced into the refinery process by removing aromatic ring-Cl resulting from waste plastics such as PP, PE, and PET. In addition, as the amount of aromatic chlorine resulting from coatings, dyes, adhesive components, and polymer polymerization additives increases in a waste plastic according to the diversification of uses, a technique for removing organic chlorine from aromatic molecules, which is more difficult than removing inorganic chlorine such as HCl or organic chlorine contained in chain molecules, has become more important.

SUMMARY

Technical Problem

The present disclosure relates to a technology for reducing a Cl content to a level capable of introducing waste plastic raw materials into a refinery process, and an object of the present disclosure is to remove aromatic chlorine resulting from coatings, dyes, adhesive components, and polymer polymerization additives in a waste plastic to a very low content level.

Technical Solution

In one general aspect, a method for removing chlorine from a waste plastic includes the steps of: a) reacting a waste plastic with a neutralizing agent; and b) reacting the product in step a) with a copper compound, wherein 95% by weight or more of chlorine is removed based on the total weight of the waste plastic.

The waste plastic may include at least one selected from the group consisting of polyethylene (PE), polypropylene (PP), polyethylene terephthalate (PET), polyvinyl chloride (PVC), and polystyrene (PS).

The waste plastic may include organic chlorine, inorganic chlorine, and aromatic chlorine, and may include 10 ppm or more of chlorine.

The neutralizing agent may be an oxide, hydroxide, carbonate of a metal, or a combination thereof, and the metal may be calcium, aluminum, magnesium, zinc, iron, or a combination thereof.

The neutralizing agent may be mixed in an amount of 0.5 to 20% by weight based on the total weight of the waste plastic.

The copper compound may include at least one selected from the group consisting of copper metal (Cu), copper oxide (CuO), copper hydroxide ($Cu(OH)_2$), and copper carbonate ($CuCO_3$).

The copper compound may be mixed in an amount of 0.1 to 20% by weight based on the total weight of the product in step a).

In step a), the neutralizing agent may be mixed in a molar ratio ($N_M/N_{Cl}$) of 1 to 25 of the total chlorine element (Cl) in the waste plastic to element metal (M) of the neutralizing agent, and in step b), the copper compound may be mixed in a molar ratio ($N_{Cu}/N_{Cl}$) of 1 to 10 of the total chlorine element (Cl) in the waste plastic to element copper (Cu) of the copper compound.

With respect to 100% by weight (A) of the chlorine content in the waste plastic, a chlorine content ratio ($A_1/A$) of the product in step a) may be 50% or less, and a chlorine content ratio ($A_2/A$) of the product in step b) may be 10% or less.

Step a) may be performed at a temperature of 200 to 320° C., and step b) may be performed at a temperature of 400 to 550° C.

Steps a) and b) may each independently be performed in at least one step selected from the group consisting of the following steps 1) and 2):

1) pretreatment step of the waste plastic
2) pyrolysis step of the waste plastic.

The step 1) pretreatment may be performed in an auger reactor at 200 to 320° C.

The step 2) pyrolysis may be performed in a pyrolysis reactor at 400 to 550° C. under a non-oxidizing atmosphere.

Advantageous Effects

According to the present disclosure, a pyrolysis oil may be prepared to a level that may be introduced into the refinery process by remarkably reducing a total chlorine content of a waste plastic pyrolysis oil as well as a chlorine content contained in organic chlorine and aromatic molecule.

DETAILED DESCRIPTION

Best Mode

Figure 1A:
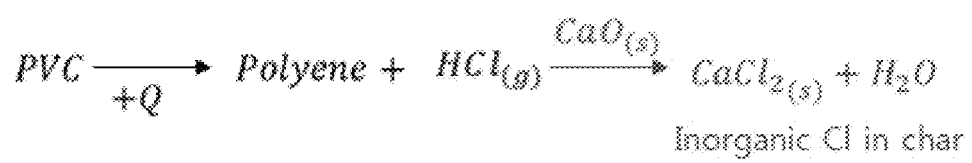
FIG. 1A is a schematic diagram illustrating a reaction mechanism of chlorine and a neutralizing agent of a waste plastic.

Unless defined otherwise, all terms (including technical and scientific terms) used in the present specification have the same meaning as meanings commonly understood by those skilled in the art to which the present disclosure pertains. Throughout the present specification, unless described to the contrary, "including" any component will be understood to imply the inclusion of other elements rather than the exclusion of other elements. In addition, a singular form includes a plural form unless specially described in the text.

"A to B" as used here refers to "A or more and B or less" unless otherwise defined.

In addition, "A and/or B" refers to at least one selected from the group consisting of A and B, unless otherwise defined.

An embodiment of the present disclosure provides a method for removing chlorine from a waste plastic. The method includes the steps of: a) reacting a waste plastic with a neutralizing agent; and b) reacting the product of step a) with a copper compound. Accordingly, in the present disclosure, a Cl content may be reduced to a level that may be introduced into a refinery process by treating waste plastic raw materials.

The waste plastic may include at least one selected from the group consisting of polyethylene (PE), polypropylene (PP), polyethylene terephthalate (PET), polyvinyl chloride (PVC), and polystyrene (PS). The waste plastic may include organic Cl, inorganic Cl, and aromatic Cl, and the waste plastic may have a chlorine content of 10 ppm or more, 50 ppm or more, 100 ppm or more, or 100 to 1,000 ppm, but the present disclosure is not limited thereto. Waste oil generated through cracking and pyrolysis reactions of a waste plastic, such as waste plastic pyrolysis oil, contains a large amount of impurities resulting from the waste plastic. In particular, it is necessary to remove chlorine components such as organic/inorganic chlorine by pre-treating the waste oil. The waste plastic may be divided into a household waste plastic and an industrial waste plastic. The household waste plastic is a plastic in which PVC, PS, PET, PBT, etc. other than PE and PP are mixed, and in the present disclosure, it may refer to a mixed waste plastic containing 3% by weight or more of PVC together with PE and PP. Chlorine resulting from PVC has a high ratio of organic Cl and inorganic Cl, so Cl in the household waste plastic may be removed with high efficiency even with inexpensive neutralizing agents (Ca-based, Zn-based, Al-based). PE/PP accounts for the majority of the industrial waste plastic, but the content of organic Cl resulting from the adhesive or dye component is high, and especially the proportion of Cl (aromatic chlorine) contained in the aromatic ring is high, so it is difficult to remove with a general low-cost neutralizing agent mentioned above.

The present disclosure is characterized in that 95% by weight or more, 97% by weight or more, 98% by weight or more, or 99% by weight or more of chlorine is removed based on the total weight of chlorine contained in the waste plastic resulting from the waste plastic. For this purpose, it is desirable to remove chlorine contained in the aromatic ring.

Step a) is a step of reacting a waste plastic with a neutralizing agent, and a large amount of HCl generated from a process of melting and pyrolysis of PVC, etc. may be removed in the form of neutralization salt, and a reaction mechanism is illustrated in FIG. 1A.

The neutralizing agent may be an oxide, hydroxide, carbonate of a metal, or a combination thereof, and the metal may be calcium, aluminum, magnesium, zinc, iron, or a combination thereof. Specifically, the neutralizing agent may be aluminum oxide, calcium oxide, magnesium oxide, zinc oxide, or iron oxide. The neutralizing agent may include a zeolite component such as E-cat.

The neutralizing agent may be mixed in an amount of 0.5 to 20% by weight, 1 to 10% by weight, or 1 to 5% by weight based on the total weight of the waste plastic. In addition, the neutralizing agent may be mixed in a molar ratio ($N_M/N_{Cl}$) of 1 to 25, specifically 0.7 to 15, and more specifically 0.5 to 5 of the total chlorine (Cl) element in the waste plastic to element metal (M) of the neutralizing agent.

On the other hand, the total number of moles of elemental chlorine (Cl) in the waste plastic may mean the total number of moles of elemental chlorine in waste plastic solid raw materials before pretreatment and pyrolysis.

In step a), a chlorine removal step, a chlorine weight ratio ($A_1/A$) of the product in step a) to 100% by weight (A) of the chlorine content of the waste plastic may be 50% or less, 40% or less, or 20 to 30%. Chlorine remaining in the waste plastic after step a) may be effectively removed in step b).

Figure 1B:
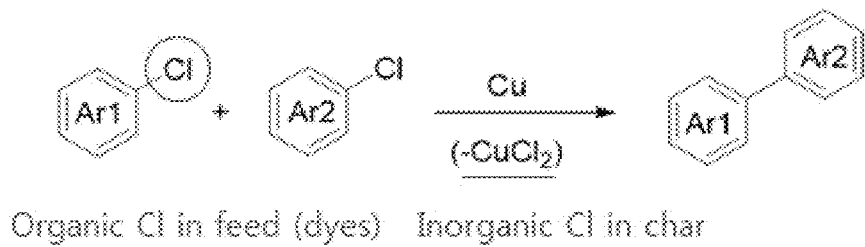
FIG. 1B is a schematic diagram illustrating a reaction mechanism of organic chlorine and aromatic chlorine and a copper compound of a waste plastic.

Step b) is a step of reacting the product in step a) with a copper compound, a small amount of organic chlorine and aromatic chlorine not removed in step a) may be removed with a copper compound (catalyst), and a reaction mechanism is illustrated in FIG. 1B. When the copper compound is used together with the neutralizing agent of step a) or used as a substitute for the neutralizing agent, the copper compound reacts first with chlorine and inorganic chlorine (HCl) positioned at the end of a hydrocarbon chain among organic chlorine, and thus it may be difficult to contact with aromatic chlorine, etc., which is difficult to remove with a neutralizing agent. In addition, since initial pyrolysis time at which the temperature inside the reactor is raised for pretreatment or pyrolysis is relatively low temperature (250 to 300° C.) and HCl starts to be generated, it is preferable to first remove chlorine with the neutralizing agent. Thereafter, when a full-scale pyrolysis process proceeds, it is relatively high temperature and a removal reaction of aromatic chlorine is activated. Accordingly, it is effective to first remove organic Cl and inorganic Cl with HCl by using the neutralizing agent, and then remove aromatic chlorine etc. with the copper compound.

The copper compound may include at least one selected from the group consisting of copper metal (Cu), copper oxide (CuO), copper hydroxide (Cu(OH)$_2$), and copper carbonate (CuCO$_3$), and specifically copper metal (Cu) and/or copper oxide (CuO).

The copper compound may be mixed in an amount of 0.1 to 20% by weight, 0.5 to 10% by weight, or 1 to 5% by weight based on the total weight of the product in step a). In addition, the copper compound may be mixed in a molar ratio ($N_{Cu}/N_{Cl}$) of 1 to 10, specifically 0.7 to 5, and more specifically 0.5 to 3 of the total chlorine (Cl) element in the waste plastic to element copper (Cu) of the copper compound.

On the other hand, the total number of moles of elemental chlorine (Cl) in the waste plastic may mean the total number of moles of elemental chlorine in waste plastic solid raw materials before pretreatment and pyrolysis.

In step b), a chlorine removal step, a chlorine weight ratio ($A_2/A$) of the product in step b) to 100% by weight (A) of the chlorine content of the waste plastic may be 10% or less, 5% or less, or 0.5 to 3%.

In a method for removing chlorine from a waste plastic according to an embodiment of the present disclosure, step a) may be performed at a temperature of 200 to 320° C., and step b) may be performed at a temperature of 400 to 550° C. When steps a) and b) are performed in the respective temperature ranges, chlorine in the waste plastic may be effectively removed.

In a method for removing chlorine from a waste plastic according to an embodiment of the present disclosure, steps a) and b) may each independently be performed in at least one step selected from the group consisting of the following steps 1) and 2):

1) pretreatment step of the waste plastic
2) pyrolysis step of the waste plastic.

In the present disclosure, the step 1) pretreatment of a waste plastic may further include a process of adding the waste plastic to a screw reactor and pulverizing it at room temperature. A grinding process known in the art may be applied to the pulverization of the waste plastic. For example, the waste plastic may be added to a pretreatment reactor and heated to about 300° C. to prepare a hydrocarbon flow precursor in a form of pellets, but the present disclosure is not limited thereto.

For example, in the pulverization process, the waste plastic and the neutralizing agent may be mixed and added to the reactor. When the waste plastic and calcium oxide, etc. as the neutralizing agent are mixed and pulverized at room temperature, a mechanochemical reaction may occur to produce hydrocarbons and CaOHCl, and thus chlorine in the waste plastic raw material may be stably fixed to CaOHCl.

Then, step 1), a pretreatment step of the waste plastic, is characterized in that the pulverized waste plastic is added to a pretreatment reactor and heated, wherein the solid waste plastic raw material may be treated physically and chemically to remove chlorine, and a hydrocarbon stream precursor (pyrolysis raw material) may be prepared. The hydrocarbon stream precursor may mean a waste plastic melt, and the waste plastic melt may mean that all or part of a pulverized or unpulverized solid waste plastic is converted into a liquid waste plastic.

For example, in step 1), a pretreatment step of the waste plastic, the pulverized or unpulverized waste plastic and the neutralizing agent may be added to the reactor, respectively, and heated. In addition, in the pretreatment step, a first pretreatment (heating) may be performed by introducing the pulverized or unpulverized waste plastic and the neutralizing agent into a reactor, and then a second pretreatment (heating) may be performed by adding a copper compound to the reactor.

The heating may be performed at a temperature of 200 to 320° C. and under normal pressure. The heating is specifically performed at a temperature of 250 to 320° C. or 280 to 300° C. In general, the pretreatment temperature of the waste plastic is at least 250° C., but in the hydrocarbon after dechlorination, the pretreatment may be easily performed even at a lower temperature of 200° C. to generate hydrogen or methane gas.

The pretreatment reactor may be an extruder, an autoclave reactor, a batch reactor, etc., and may be, for example, an auger reactor, but the present disclosure is not limited thereto.

Step 2), a pyrolysis step of the waste plastic, is a process of adding the pyrolysis raw material, which is classified into three material phases, a gas phase, a liquid phase (oil+wax+water), and a solid phase, to the reactor, and specifically a process of preparing waste plastic pyrolysis oil by adding the non-pretreated or pretreated waste plastic to a pyrolysis reactor and heating the mixture.

For example, in the pyrolysis step, the pretreated waste plastic and copper compound may be mixed and added to the reactor, and then heated to prepare pyrolysis oil. In addition, in the pyrolysis process, a first pyrolysis for producing pyrolysis oil may be performed by mixing the waste plastic and the neutralizing agent, adding the mixture to the reactor, and heating the mixture, and then a second pyrolysis in which a copper compound is added to the reactor and heated may be performed, and at least two pyrolysis may be performed continuously or discontinuously.

The heating may be performed at a temperature of 320 to 900° C., specifically 350 to 700° C., and more specifically 400 to 550° C. under a non-oxidizing atmosphere. In addition, the heating may be performed under normal pressure. The non-oxidizing atmosphere may be an atmosphere in which the waste plastic does not oxidize (combust), and may be, for example, an atmosphere in which an oxygen concentration is adjusted to 1% by volume or less, or an atmosphere of an inert gas such as nitrogen, water vapor, carbon dioxide, and argon.

If the heating temperature is 400° C. or more, the fusion of chlorine-containing plastics may be prevented, and conversely, if the heating temperature is 550° C. or less, chlorine in the waste plastic may remain in pyrolysis char in a form of CaCl$_2$), CuCl$_2$, etc.

The pyrolysis process may further include a gas recovery process for recovering the pyrolysis gas and a separation process for separating the pyrolysis solids into particulates and granules.

In the gas recovery process, a pyrolysis gas containing a low boiling point hydrocarbon compound such as methane (CH$_4$), ethane (C$_2$H$_6$), and propane (C$_3$H$_8$) is recovered in the gas phase generated from the pyrolysis process. The pyrolysis gas generally includes combustible materials such as hydrogen, carbon monoxide, and a low molecular weight hydrocarbon compound. Examples of the hydrocarbon compound may include methane, ethane, ethylene, propane, propene, butane, butene, etc. Such a pyrolysis gas contains combustible materials and thus may be used as fuel.

In the separation process, the solids in the solid phase produced in the pyrolysis process, such as carbides and a neutralizing agent and/or a copper compound, are separated into particulates and granules. Specifically, the solids produced by the pyrolysis reaction may be separated into particulates and granules by classifying using a sieve smaller than an average particle diameter of the chlorine-containing plastic and larger than the average particle diameter of the neutralizing agent and copper compound. In the separation process, it is preferable to separate the solids into a chlorine-containing neutralizing agent, particulates containing a relatively large amount of copper compounds and granules containing relatively large amounts of carbides. The particulates and carbides may be reprocessed as necessary and reused, used as fuel, or disposed in the pyrolysis process but the present disclosure is not limited thereto.

The pyrolysis process may be performed in an autoclave reactor, a batch stirred reactor, a fluidized-bed reactor, and a packed-bed reactor, etc., and specifically, may be applied to any reactor capable of stirring and temperature rise control. In the present disclosure, the pyrolysis process may be performed in a batch reactor, but the present disclosure is not limited thereto.

The pyrolysis oil prepared by the method for removing chlorine from a waste plastic according to an embodiment of the present disclosure may have a chlorine content of 100 ppm or less, 70 ppm or less, 65 ppm or less, 60 ppm or less, 50 ppm or less, or 35 ppm or less, specifically an organic chlorine content of 50 ppm or less, 30 ppm or less, 20 ppm or less, 15 ppm or less, or 10 ppm or less, an inorganic chlorine content of 30 ppm or less, 15 ppm or less, or 10 ppm or less, and an aromatic chlorine content of 20 ppm or less, 10 ppm or less, 5 ppm or less, or 3 ppm or less based on the total weight. Accordingly, it is possible to prepare pyrolysis oil at a level that maybe introduced into the refinery process from a waste plastic containing a high content of Cl.

On the other hand, the organic chlorine content, inorganic chlorine content, and aromatic chlorine content may mean the content of chlorine contained in the organics, the content of chlorine contained in the inorganics, or the content of chlorine contained in the aromatic ring of the aromatic compound, respectively.

Hereinafter, preferred examples and comparative examples of the present disclosure will be described. However, the following examples are only a preferred example of the present disclosure, and the present disclosure is not limited to the following examples.

EXAMPLES

Example 1-1

200 g of industrial waste plastic feed was added to feed injection part and was crushed with a screw. After adding 200 g/hr of a crushed waste plastic and 10% by weight of Cao to an auger reactor, pretreatment was performed under the conditions of a screw speed of 10 rpm, a nitrogen flow rate of 3 cc/min, 300° C., and a residence time of 1 hr.

The pretreated waste plastic and 5% by weight of CuO were added to a batch pyrolysis reactor, and pyrolysis was performed at 500° C. After collecting pyrolysis gas in a condenser, pyrolysis oil was obtained from a recovery part.

In this case, an industrial waste plastic was waste vinyl from duty-free shops, was mostly made of PE/PP, and had a total Cl of 853 ppm.

Example 1-2

A pyrolysis oil was obtained in the same manner as in Example 1-1, except that 5% by weight of Cu(copper wire of 1.0 mm) was added instead of 5% by weight of CuO.

Comparative Example 1-1

A pyrolysis oil was obtained in the same manner as in Example 1-1, except that pretreatment was not performed and CuO was not added during pyrolysis.

Comparative Example 1-2

A pyrolysis oil was obtained in the same manner as in Example 1-1, except that Cao was not added during pretreatment and CuO was not added during pyrolysis.

Comparative Example 1-3

A pyrolysis oil was obtained in the same manner as in Example 1-1, except that E-cat was added instead of Cao during pretreatment and CuO was not added during pyrolysis.

Comparative Example 1-4

A pyrolysis oil was obtained in the same manner as in Example 1-1, except that CaO was not added during pretreatment and CaO was used instead of CuO during pyrolysis.

Comparative Example 1-5

A pyrolysis oil was obtained in the same manner as in Example 1-1, except that CuO was added instead of CaO during pretreatment and CaO was used instead of CuO during pyrolysis.

Example 2-1

A pyrolysis oil was obtained in the same manner as in Example 1-1, except that household waste plastic feed was used instead of industrial waste plastic feed.

In this case, a composition of a household waste plastic in the living system was 77 to 80% by weight of waste PP, 17 to 20% by weight of waste PE, 0 to 6% by weight of waste soft PVC (plasticizer+PVC). The total Cl content contained in waste PP was 444 ppm, the total Cl content in waste PE was 694 ppm, the total Cl content in waste soft PVC was 243,000 ppm, and the total Cl content in a household waste plastic was 8,100 ppm.

Example 2-2

A pyrolysis oil was obtained in the same manner as in Example 1-2, except that the household waste plastic feed of Example 2-1 was used instead of the industrial waste plastic feed.

Comparative Examples 2-1 to 2-5

Pyrolysis oils were obtained in the same manner as in Comparative Examples 1-1 to 1-5, respectively, except that the household waste plastic feed of Example 2-1 was used instead of the industrial waste plastic feed.

[Evaluation Example]: Chlorine Content Evaluation of Pyrolysis Oil

The Cl content of the pyrolysis oils obtained in Examples 1-1, 1-2, 2-1 and 2-2 and Comparative Examples 1-1 to 1-5 and 2-1 to 2-5 was measured and shown in Table 1 below.

TABLE 1

|  | Total Cl content (ppm) | | |
| --- | --- | --- | --- |
|  | Cl in feed | Total Cl in final pyrolysis oil | Organic Cl in final pyrolysis oil |
| Example 1-1 | 853 | 33 | 6 |
| Example 1-2 |  | 49 | 9 |
| Comp. Example 1-1 |  | 310 | 107 |
| Comp. Example 1-2 |  | 231 | 67 |
| Comp. Example 1-3 |  | 55 | 36 |
| Comp. Example 1-4 |  | 85 | 46 |
| Comp. Example 1-5 |  | 52 | 31 |
| Example 2-1 | 8,100 | 64 | 11 |
| Example 2-2 |  | 63 | 10 |
| Comp. Example 2-1 |  | 5,580 | 524 |
| Comp. Example 2-2 |  | 464 | 168 |
| Comp. Example 2-3 |  | 127 | 15 |
| Comp. Example 2-4 |  | 140 | 24 |
| Comp. Example 2-5 |  | 110 | 14 |

Referring to Table 1, it could be seen that from Examples, the use of CaO during pretreatment and the use of a copper compound (Cu/CuO) during pyrolysis were more effective in removing aromatic Cl. It was analyzed that these results are because a reaction between aromatic Cl and copper compound is more active than chlorine and inorganic chlorine (HCl) located at the end of a hydrocarbon chain organic chlorines at among a pyrolysis temperature of 500° C.

It could be confirmed that in Example 1-1, not only the total Cl content of the pyrolysis oil but also the organic cl content could be reduced to a remarkably small content by implementing all the components of the present disclosure. On the other hand, a pyrolysis oil obtained in Comparative Example 1-1 did not have enough chlorine to be removed as HCl is removed as oil vapor by a simple pyrolysis reaction. A pyrolysis oil obtained in Comparative Example 1-2 had a good chlorine removal rate compared to the pyrolysis oil of Comparative Example 1-1, but was also not at a level that could be introduced into the refinery process as the pyrolysis proceeds after simple pretreatment without a neutralizing agent in the auger reactor before pyrolysis. In Comparative Examples 1-3 and 1-4, CaO or E-cat was used to replace the copper compound, but the prepared pyrolysis oil contains a relatively high content of organic Cl. It was analyzed that these results are because aromatic Cl cannot be sufficiently removed during pyrolysis.

It could be confirmed that in Example 2-1, even in the pyrolysis of a household waste plastic having a high organic Cl content in the feed, not only the total Cl content of the pyrolysis oil but also the organic Cl content could be reduced to a remarkably small content by implementing all the components of the present disclosure. It was confirmed that from Comparative Example 2-1, only about 70% of total Cl in the feed could be removed by a simple pyrolysis reaction. It was confirmed that in Comparative Example 2-2, Cl could be reduced by about 94% only by simple pretreatment without a neutralizing agent, etc. in the auger reactor before pyrolysis. However, in Comparative Examples 2-1 and 2-2, a pyrolysis oil at a level sufficient to be introduced into the refinery process was not obtained. In Comparative Examples 2-3 and 2-4, CaO or E-cat, which are commonly used additives, was used, but the total Cl was higher than that of Comparative Example 2-2.

Comparative Examples 1-5 and 2-5 showed a higher organic Cl content than Examples 1-1 and 2-1. These results were analyzed that a large amount of inorganic Cl and organic Cl was removed by first treating the feed having high chlorine content with CuO, but it was difficult to effectively remove aromatic Cl with the Cao neutralizing agent added during pyrolysis, so a relatively large amount of organic Cl remained. Thus, it could be seen that in order to remove aromatic Cl in waste oil, it is important to contact the copper compound with aromatic chlorine, etc., and for this purpose, it is preferable to first remove a large amount of organic chlorine and inorganic chlorine with an inexpensive neutralizing agent.

The present disclosure has been described hereinabove, but the present disclosure is not limited to the above embodiments, but may be implemented in various different forms, and those skilled in the art to which the present disclosure pertains may understand that the present disclosure may be implemented in other specific forms without changing the technical spirit or essential features of the present disclosure. Therefore, it is to be understood that examples described above are illustrative rather than being restrictive in all aspects.

The invention claimed is:

1. A method for removing chlorine from a waste plastic, the method comprising a pretreatment step of the waste plastic and a pyrolysis step of the waste plastic to produce a waste plastic pyrolysis oil, wherein steps a) and b) as follows are independently performed in at least one step selected from the pretreatment step and the pyrolysis step:
   a) reacting the waste plastic with a neutralizing agent; and
   b) reacting the product in step a) with a copper compound,
      wherein 95% by weight or more of chlorine is removed based on the total weight of the waste plastic.

2. The method of claim 1, wherein the waste plastic comprises at least one plastic selected from the group consisting of polyethylene (PE), polypropylene (PP), polyethylene terephthalate (PET), polyvinyl chloride (PVC), and polystyrene (PS).

3. The method of claim 1, wherein the waste plastic comprises organic chlorine, inorganic chlorine, and/or aromatic chlorine, and comprises 10 ppm or more of chlorine.

4. The method of claim 1, wherein the neutralizing agent is an oxide, hydroxide, carbonate of a metal, or a combination thereof, and
   the metal is calcium, aluminum, magnesium, zinc, iron, or a combination thereof.

5. The method of claim 1, wherein the neutralizing agent is mixed in an amount of 0.5 to 20% by weight based on the total weight of the waste plastic.

6. The method of claim 1, wherein the copper compound comprises at least one selected from the group consisting of copper metal (Cu), copper oxide (CuO), copper hydroxide ($Cu(OH)_2$), and copper carbonate ($CuCO_3$).

7. The method of claim 1, wherein the copper compound is mixed in an amount of 0.1 to 20% by weight based on the total weight of the product in step a).

8. The method of claim 1, wherein
   in step a), the neutralizing agent is mixed in a molar ratio ($N_M/N_{Cl}$) of 1 to 25 of the total chlorine element (Cl) in the waste plastic to element metal (M) of the neutralizing agent, and in step b), the copper compound is mixed in a molar ratio ($N_{Cu}/N_{Cl}$) of 1 to 10 of the total chlorine element (Cl) in the waste plastic to element copper (Cu) of the copper compound.

9. The method of claim 1, wherein with respect to 100% by weight (A) of the chlorine content in the waste plastic,
a chlorine content ratio (A1/A) of the product in step a) is 50% or less, and
a chlorine content ratio (A2/A) of the product in step b) is 10% or less.

10. The method of claim 1, wherein step a) is performed at a temperature of 200 to 320° C., and step b) is performed at a temperature of 400 to 550° C.

11. The method of claim 1, wherein the step 1) pretreatment step is performed in an auger reactor at 200 to 320° C.

12. The method of claim 1, wherein the step 2) pyrolysis step is performed in a pyrolysis reactor at 400 to 550° C. under a non-oxidizing atmosphere.

13. A method for removing chlorine from a waste plastic, the method comprising a pretreatment step of a waste plastic as a recycled feed and a pyrolysis step of the waste plastic as the recycled feed to produce a waste plastic pyrolysis oil, wherein steps a) and b) as follows are independently performed in at least one step selected from the pretreatment step and the pyrolysis step:
a) reacting the waste plastic as the recycled feed with a neutralizing agent; and
b) reacting the product in step a) with a copper compound, wherein 95% by weight or more of chlorine is removed based on the total weight of the waste plastic.

14. The method of claim 1, wherein the waste plastic is reacted with the neutralizing agent in the pretreatment step to form a pretreated waste plastic and the pretreated waste plastic is reacted with the copper compound in the pyrolysis step.

15. The method claim 13, wherein the waste plastic as the recycled feed is reacted with the neutralizing agent in the pretreatment step to form a pretreated waste plastic and the pretreated waste plastic is reacted with the copper compound in the pyrolysis step.

* * * * *